July 10, 1962   G. C. BATLEY   3,042,953
WINDSHIELD WIPER MECHANISM
Filed Sept. 22, 1960

GEORGE C. BATLEY
INVENTOR.

BY John C. Faulkner
Keith L. Zerschling

ATTORNEYS

3,042,953
WINDSHIELD WIPER MECHANISM
George C. Batley, Solihull, Birmingham, England, assignor to Ford Motor Company, Dearborn, Mich., a corporation of Delaware
Filed Sept. 22, 1960, Ser. No. 57,672
Claims priority, application Great Britain Mar. 31, 1960
7 Claims. (Cl. 15—250.2)

This invention relates to windshield wiper mechanisms, and more particularly, but not solely, to wiper mechanisms for wrap-around and wrap-over windshields of motor vehicles.

The modern tendency in windshield design to the wrap-around and wrap-over types has caused considerable difficulties in the manufacture of wiper mechanisms capable of satisfactorily wiping the windshields over a sufficiently large area.

The invention includes a windshield wiping mechanism comprising means for causing relative movement between the two ends of a wiper element during the sweep across the windshield, such movement being in a direction generally perpendicular to the plane of the sweep.

Preferably the wiper element is carried by two holding members attached to a flexible supporting element for the wiper element near the ends thereof, the holding members being pivoted for relative movement.

Preferably also the lower of the holding members is permanently spring urged towards the windshield, while the upper of the holding members is spring urged away from the windshield, but is held in contact therewith by an externally applied force.

Conveniently this force is applied by means of a cable attached to a cam follower, the position of which varies during the sweep.

Other objects, advantages and features of the present invention will be made more apparent as this description proceeds, particularly when considered in connection with the accompanying drawings wherein.

Figure 1:
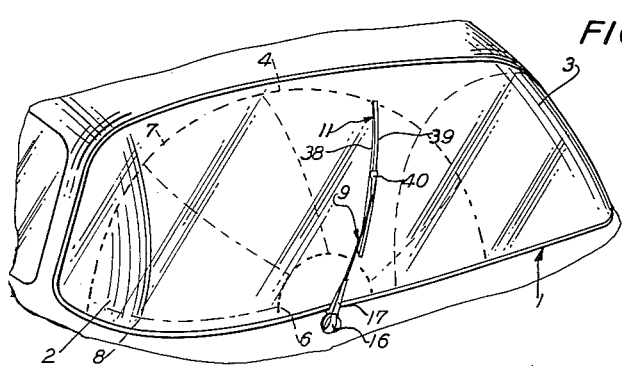
FIGURE 1 shows diagrammatically a wrap-around and wrap-over windshield and adjacent parts of a motor vehicle with a wiper.

Referring first to FIGURE 1 there is shown a windshield 1 having swept back side portions 2 and 3 and a swept back upper portion 4, i.e. of the wrap-around and wrap-over type. A windshield wiper according to the invention is shown mounted on the vehicle to sweep out an area backed by the arcs 6 and 7, with a rest position 8 shown at one end of the sweep. The wiper comprises an arm 9 and a blade assembly 11.

Figure 5:
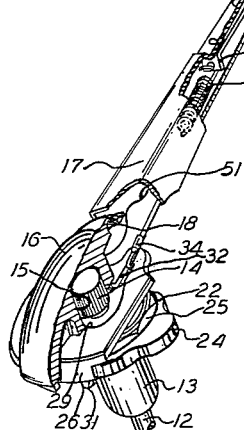
FIGURE 5 is a section through a part of the drive mechanism.

The drive for the arm is supplied to a spindle 12 journalled in a bearing 13 (see FIGURES 2 and 5), the spindle 12 having a splined head 14 co-operating with a splined recess 15 in a housing 16, to which is pivoted a cover member 17 attached to the arm 9. The actual pivot is not shown but may be of any conventional construction, such as that shown in U.S. Patent 2,773,712 issued December 11, 1956 to H. I. Chambers, and is located in the recess 18 formed in the housing 16. A tension spring 19 is arranged between an extension 21 of arm 9 and a portion of housing 16 to urge the arm 9 in such direction as to press the blade assembly 11 against the windshield 1.

A cam 22 (see also FIGURES 3 and 4) is nonrotatably secured to the bearing 13 by means of a flatted aperture 23 co-operating with a corresponding surface on bearing 13. The cam 22 has a single lobe 24 and is retained against axial movement on the bearing 13 by a nut 25.

A plate 26 is radially slidable in housing 16, being retained by shoulders 27 and 28 and having an aperture 29 through which spindle 12 passes. Plate 26 carries at one end thereof a pin 31 which bears on the cam 22. At its opposite end the plate 26 has a slot 32, in the embodiment illustrated on extension of aperture 29, which forms an anchorage for one end 34 of a cable 33.

A packing member 35, in the form of a light compression washer, is provided between plate 26 and nut 25 and the bearing 13.

The cable 33 is retained in the region of arm 9 by guide clips 36 and 37 which are a tight sliding fit in the arm 9. Clips 36 and 37 may provide an adjustment for the cable tension when the wiper is in the position 8 of FIGURE 1.

The blade assembly comprises a blade 38 mounted in generally conventional manner to a flexible blade support 39. At the middle of the blade support 39 a bridge member 40 is fixedly secured by hooks 41 engaging recesses in the edge of the blade support 39. Inner and outer arms 42 and 43 are each pivoted on the bridge member 40 at one end and slidably secured to the blade support 39 by hooks 44 and 45 respectively at their opposite ends. Conventional torsion springs (not shown), such as those disclosed in U.S. Patent 2,772,436 issued December 4, 1956, to R. Deibel, and U.S. Patent 2,905,961 issued September 29, 1959, to J. R. Oishei et al., are provided about the respective pivots to urge inner arm 42 towards the windshield and outer arm 43 away from the windshield, and slots 46 are provided in lugs 47 of arm 43 to receive a yoke 48 fixed to the outer end of cable 33. The bridge member 40 is arranged to receive and secure a cranked end 49 of the arm 9.

For assembly purposes it is essential that the cable may be slackened, and to ensure that cover member 17 may be pivoted sufficiently for this purpose, cut away portions 51 are provided to allow clearance between cover member 17 and housing 16.

Figure 2:
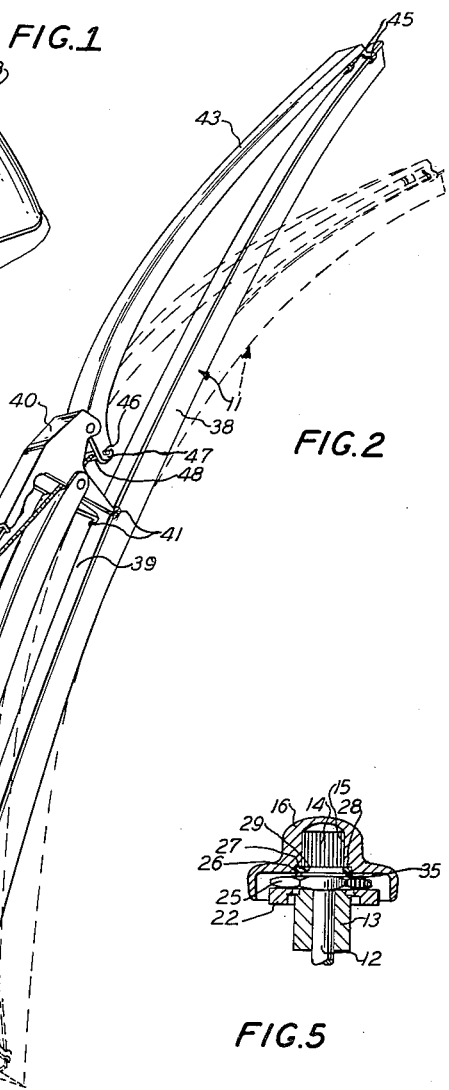
FIGURE 2 is a partially cut away perspective view of a wiper mechanism according to the invention.

In operation, when the blade is in the position illustrated in FIGURE 1 the element of the windshield being wiped is comparatively flat and the blade assembly is in the position shown in full lines in FIGURE 2, with arm 42 urged against the windshield by its torsion spring, cable 33 restraining arm 43 from parting from the windshield under the influence of its torsion spring and spring 19 urging the whole assembly against the windshield.

Figure 3:
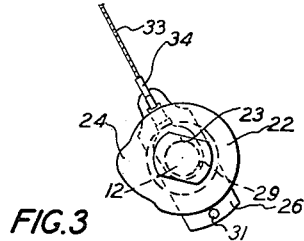
FIGURES 3 and 4 show, in bottom plane, a detail of the mechanism in two different positions.
Figure 4:
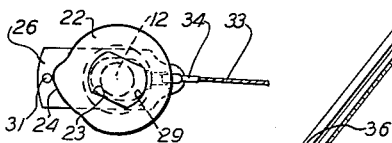

As spindle 12 rotates to carry the assembly counterclockwise as seen in FIGURE 1 towards the extreme portion 8, housing 16 and plate 26 rotate relative to the cam 22 from the position of FIGURE 3 towards that of FIGURE 4 and it will be seen that as the position of FIGURE 4 is approached pin 31 meets lobe 24 and consequently plate 26 moves radially across inside housing 16 and cable 33 is pulled so that arm 43 moves towards the position shown chain dotted in FIGURE 2. Similarly arm 42 is urged by its torsion spring to maintain contact with the windshield and spring 19 maintains overall contact of the blade assembly with the windshield. Thus the support 39 is caused to flex and adapt itself to the contour of the windshield.

On the reverse stroke as pin 31 moves clear of the lobe 24 the arm 43 is moved by its torsion spring and pin 31 is thus retained in contact with cam 22.

To reduce friction and noise during operation of the mechanism, relatively movable parts such as cam 22 and plate 26 may be made of self lubricating materials.

It will be understood that the invention is not to be limited to the exact construction shown and described, but that various changes and modifications may be made

I claim:

1. In a windshield wiper apparatus for cleaning a curved surface, the combination comprising, an oscillatable arm, shaft means connected to one end of said arm for imparting an oscillating motion to said arm, an outer holding member and an inner holding member pivotally mounted on the other end of said arm, a flexible wiper blade affixed to said outer holding member and to said inner holding member, means connected to said outer holding member and said arm for urging said outer holding arm away from said curved surface, means connected to said inner holding member and said arm for urging said inner holding arm toward said curved surface, and means coupled to said outer holding member and to said shaft means for urging said outer holding member and a portion of the flexible blade carried thereby toward said curved surface during a portion of each wiping cycle.

2. In a windshield wiper mechanism for a wrap around windshield of an automotive vehicle, said wrap around windshield having a portion of substantial curvature, the combination comprising, an arm, shaft means attached to said arm for oscillating said arm, support means for said shaft, a cam supported from said support means and having a lobe, a plate member connected to said arm for rotation therewith and positioned in engagement with said cam, said plate being capable of sliding movement on said shaft means, a blade assembly connected to said arm, said blade assembly including a bridge member, an inner wiper arm and an outer wiper arm pivotally mounted upon said bridge member, a flexible wiper blade supported by said inner wiper arm and said outer wiper arm for engagement with said windshield, and means connected to said plate and said outer wiper arm for urging said outer wiper arm toward said windshield as the lobe on said cam engages said plate and as said blade assembly moves over the portion of the windshield having substantial curvature.

3. In a windshield wiper mechanism for a wrap around windshield of an automotive vehicle, said wrap around windshield having a portion of substantial curvature, the combination comprising, an arm, shaft means attached to said arm for oscillating said arm, support means for said shaft, a cam supported from said support means, said cam having a lobe, a plate member connected to said arm for rotation therewith and positioned in engagement with said cam, said plate being capable of sliding movement on said shaft means, a blade assembly connected to said arm, said blade assembly including a bridge member, an inner wiper arm and an outer wiper arm pivotally mounted upon said bridge member, a flexible wiper blade supported by said inner wiper arm and said outer wiper arm, and a flexible cable connected to said plate and said outer wiper arm whereby said outer wiper arm is urged toward said windshield as the lobe on said cam engages said plate and as said blade assembly moves over the portion of the windshield having substantial curvature.

4. In a windshield wiper mechanism for a wrap around windshield of an automotive vehicle, said wrap around windshield having a portion of substantial curvature, the combination comprising, an arm, shaft means attached to said arm for oscillating said arm, support means for said shaft, a cam supported from said support means and having a lobe, a plate member connected to said arm for rotation therewith and positioned in engagement with said cam, said lobe coming into engagement with said plate as said arm moves over the portion of the windshield having substantial curvature, said plate being capable of sliding movement on said shaft means as said lobe comes into engagement therewith, a blade assembly, said blade assembly including a bridge member affixed to said arm, an inner wiper arm and an outer wiper arm pivotally mounted upon said bridge member, said outer wiper arm having a leg extending toward said windshield from the position of its pivotal mounting, a flexible wiper blade supported by said inner wiper arm and said outer wiper arm, a cable attached to said plate and the leg of said outer wiper arm for urging the portion of the flexible wiper blade affixed to the outer wiper arm toward the portion of the windshield having substantial curvature as the lobe on said cam comes into engagement with said plate.

5. In a windshield wiper apparatus for cleaning a curved surface, the combination comprising, an oscillatable arm, shaft means connected to one end of said arm for imparting an oscillating motion thereto, an outer holding member and an inner holding member pivotally mounted on the other end of said arm, a flexible wiper blade affixed to said outer holding member and to said inner holding member, means connected to said outer holding member and said arm for urging said outer holding member away from said curved surface, a plate having a slot positioned therein, said plate being mounted on said shaft for sliding movement with respect to said shaft, means engaging said plate for moving said plate in a direction away from said outer holding member during a portion of each wiping cycle, and means coupled to said plate and to said outer holding member for urging said outer holding member and a portion of said flexible blade toward the curved surface during a portion of each wiping cycle.

6. In a windshield wiper apparatus for cleaning a curved surface, the combination comprising, an oscillatable arm, shaft means connected to one end of said arm for imparting an oscillating motion thereto, a flexible wiper blade affixed to the other end of said arm for engagement with the curved surface, a plate having a slot positioned therein, said plate being mounted on said shaft for sliding movement with respect to said shaft and for rotation with said shaft, a cam engaging said plate for moving said plate in a direction away from said flexible wiper blade during a portion of each wiping cycle, and a cable coupled to said plate and to a portion of said flexible wiper blade for urging said portion toward the curved surface during a portion of each wiping cycle.

7. In a windshield wiper apparatus for cleaning a curved surface, the combination comprising, an oscillatable arm, shaft means connected to one end of said arm for imparting an oscillating motion thereto, a flexible wiper blade affixed to the other end of said arm for engagement with the curved surface, pivotal means affixed to said arm and a portion of said flexible wiper blade, a plate having a slot positioned therein mounted on said shaft for rotation therewith, said slot having a length greater than the width of said shaft to permit said plate to slide upon said shaft in a direction substantially perpendicular to the axis of said shaft, a cam engaging said plate for moving said plate in a direction away from said flexible wiper blade during a portion of each wiping cycle, and a cable connected to said plate and to the pivotal means whereby the portion of the flexible wiper blade affixed to said pivotal means is pivoted toward said curved surface when said cam moves said plate away from said flexible wiper blade.

References Cited in the file of this patent

UNITED STATES PATENTS

| | | |
|---|---|---|
| 2,800,676 | Makela et al. | July 30, 1957 |
| 2,820,238 | Roth et al. | Jan. 21, 1958 |
| 2,905,961 | Oishei et al. | Sept. 29, 1959 |